Oct. 16, 1928.
G. L. WINGFIELD
1,687,963
TRAP
Filed Nov. 30, 1927
2 Sheets-Sheet 1
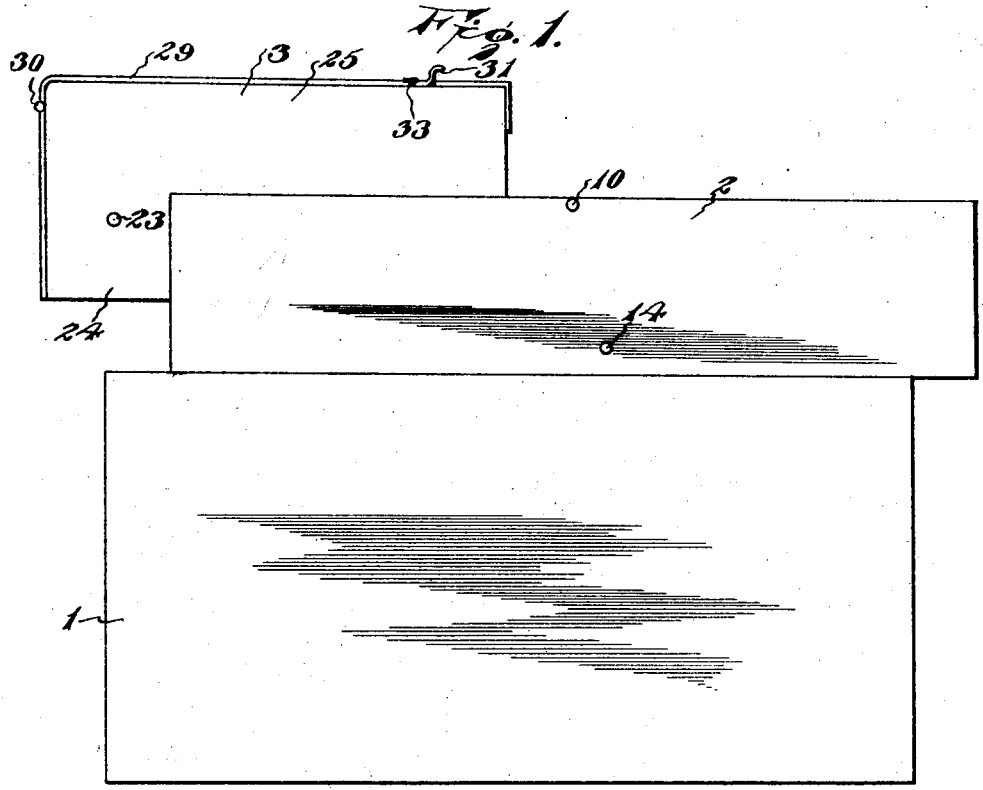
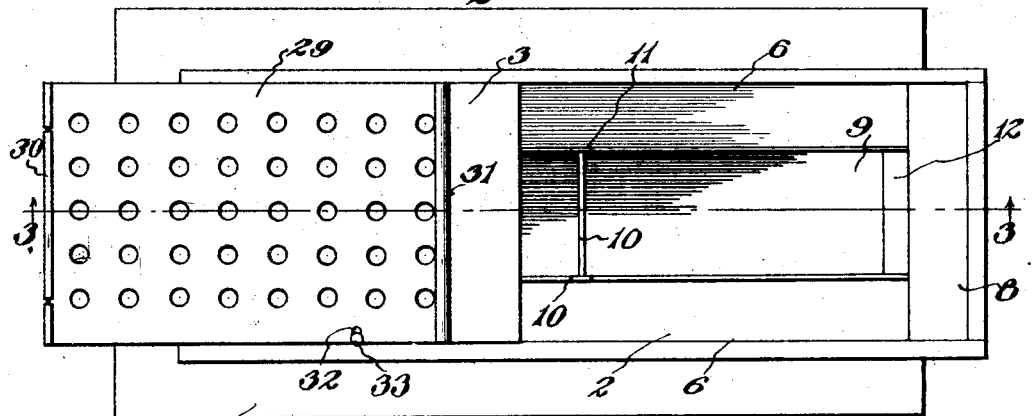
Inventor
G. L. Wingfield Oct. 16, 1928.

G. L. WINGFIELD

TRAP

Filed Nov. 30, 1927

Inventor
G. L. Wingfield

By Lacey & Lacey, Attorneys

Patented Oct. 16, 1928.

1,687,963

UNITED STATES PATENT OFFICE.

GROVER L. WINGFIELD, OF SANDSTONE, WEST VIRGINIA.

TRAP.

Application filed November 30, 1927. Serial No. 236,790.

This invention relates to fishing and trapping and more particularly to a trap of the tilting platform type wherein an animal walks along a pivoted platform in order to approach bait and is dropped into a chamber where it will be confined or drowned according to whether or not water is placed in the chamber.

One object of the invention is to provide a trap of this character in which the platform is pivotally mounted in a housing resting upon the confining chamber in enclosing relation to an opening formed therein and a bait housing carried by the body and disposed over an end portion of the body and platform in shielding relation to a bait pan carried by a trigger through the means of which a latch may be moved out of supporting relation to the platform.

Another object of the invention is to compel the animal to walk along the pivoted platform towards its inner end when entering the bait housing to consume the bait and to prevent the animal from reaching the bait without actuating the trigger and thereby cause the latch to be moved out of supporting engagement with the platform. It will thus be seen that before the animal can consume the bait the platform will be released and the weight of the animal will tilt the platform downwardly to precipitate the animal into the confining chamber.

Another object of the invention is to permit the bait housing to be easily opened in order to place the bait in the bait holder but prevent an animal from approaching the bait holder without entering the bait chamber and walking along the platform.

Another object of the invention is to provide the bait holder with an extension constituting a counter-weight which may be adjusted to cause the latch to have proper supporting engagement with the platform when in its normal position.

Another object of the invention is to connect the latch with the trigger by a rod or link which may be adjusted in order to insure movement of the latch out of supporting engagement with the platform when pressure is applied to the trigger by an animal attempting to reach the bait.

Another object of the invention is to permit the body in which the platform is pivotally mounted to be removed from the confining chamber in order to remove animals from the chamber but prevent the body from accidentally moving out of its proper position upon the chamber.

The invention is illustrated in the accompanying drawings, wherein

Figure 1 is a view showing the improved trap in side elevation;

Fig. 2 is a top plan view of the trap;

Figure 3:
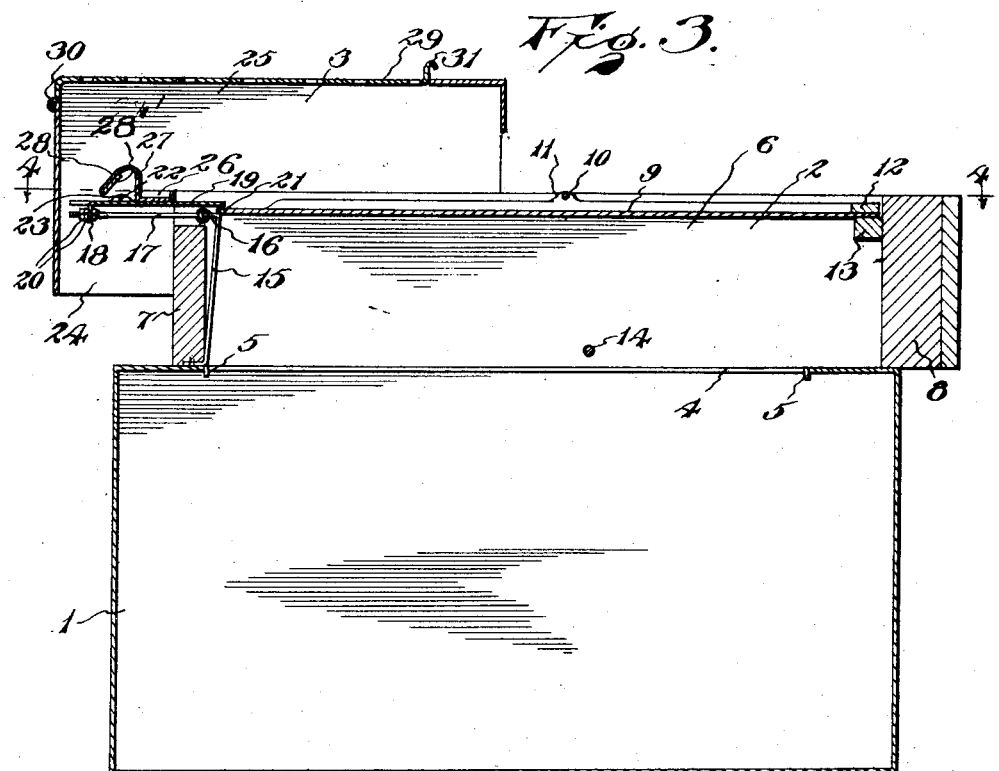
Fig. 3 is a longitudinal vertical sectional view through the trap taken on the line 3—3 of Fig. 2.
Figure 4:
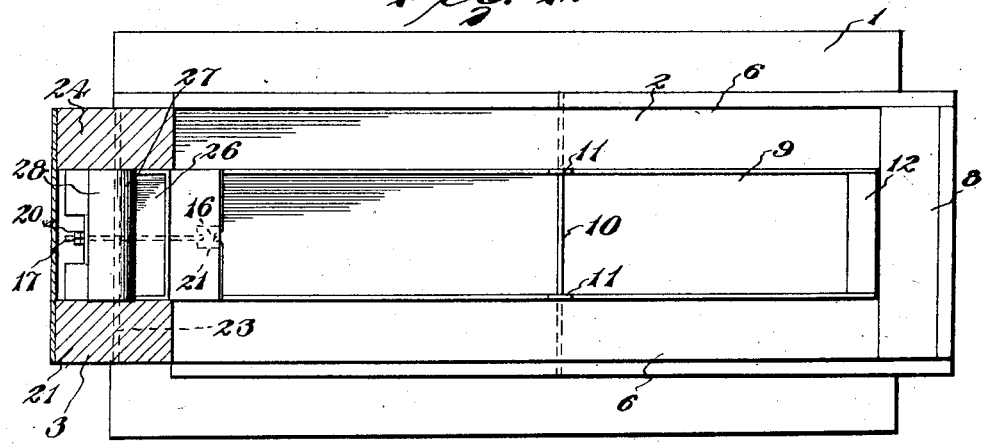
Fig. 4 is a horizontal sectional view taken longitudinally of the trap on the line 4—4 of Fig. 3.

The improved trap consists of a confining chamber 1, a body 2 which rests upon the chamber 1 and a bait housing 3 carried by the body 2 and disposed over one end portion thereof, as shown in Figs. 1 and 3. The confining chamber 1 is preferably formed of strong metal so that water may be placed in it if it is desired to drown the animals caught and also to prevent animals from gnawing their way out of the chamber if water is omitted so that the animals will be confined in a live state. The bottom and walls of the chamber are solid metal but the upper wall or top of the chamber is formed with an opening 4 about which the body 2 is disposed, as shown in Fig. 3, and this body carries depending pins 5 which fit into the corners of the opening 4 and serve to prevent the body from sliding longitudinally or transversely across the top of the chamber. Therefore, the body may be easily set in place or removed by the owner of the trap but will be prevented from sliding thereon and moving out of proper position with respect to the opening 4.

The body 2 may be formed of wood or metal and is preferably oblong in shape and provided with side walls 6 and end walls 7 and 8. The platform 9, which is preferably of metal, extends longitudinally in the body close to the open top thereof and is pivotally mounted by a pin or axle 10 which extends across the platform through hinge ears 11 and has its end portions fitted into openings formed in the side walls 6. The outer end of the platform is weighted, as shown at 12, and, therefore, the platform will normally remain in the horizontal position shown in Fig. 3 with its outer end resting upon a support 13 carried by the end wall 8 and its inner end close to the top of the end wall 7. An abutment pin 14 extends transversely through the body below the pin 10, as shown in Figs. 1 and 3, so that, when the inner end of the platform is swung downwardly by the weight of an animal, the platform will contact with the pin 14 and thereby prevent it from swinging downwardly too far and also caused to rebound and return to its normal horizontal position.

In order to releasably support the inner end of the platform and prevent it from tilting downwardly before the animal has approached close to its inner end, there has been provided a latch 15 consisting of a strip of resilient metal secured to the wall 7 at the bottom thereof and extending upwardly in diverging relation to the inner surface of this wall. The upper end of the latch strip is bent outwardly, as shown at 16, to extend over the upper edge of the end wall 7 and this extension carries a link or rod 17 which has its outer end portion threaded and passed through a tongue 18 extending downwardly from the outer end of a trigger plate 19. Securing nuts 20 are carried by the link 17 to engage the tongue and securely hold the link in proper engagement therewith. Since the latch is formed of resilient sheet metal, it will normally remain in the position shown in Fig. 3 so that the spur or finger 21 projecting from the inner end of the platform may rest upon the upper end of the latch and very effectively support the platform and prevent it from prematurely tilting downwardly. Therefore, when an animal is walking along the platform towards the inner end thereof, the platform will not tilt as soon as the animal moves a short distance beyond the pivot pin 10 and the animal will not be frightened and caused to spring rearwardly of the platform and leave the trap without being caught. It is well known that animals are easily frightened if they walk upon an object which is not well supported and will not move along a platform which starts to tilt as soon as they pass the pivotal mounting of the platform. The trigger plate 19 is also preferably formed of sheet metal and is provided at its sides with hinge ears 22 to receive a pivot pin 23. This pin has its end portions fitted into openings formed in portions 24 of the side walls 25 of the bait housing which extend downwardly against the outer face of the end wall 7. Therefore, the latch plate will be pivotally mounted and normally remain in a horizontal plane, as shown in Fig. 3, with its inner end portion extending into the body above the end wall 7 and overlying the spur or finger 21 of the platform 9. By this arrangement the latch plate will terminate at approximately the inner end of the platform 9 and since the bait pan 26 is carried by the latch plate near its pivot pin 23 an animal moving along the platform must step upon the latch plate in order to reach the bait pan. As the animal steps upon the latch plate, the inner end thereof will be depressed and its outer end portion swung upwardly so that the tongue 18 will exert a pulling action upon the link 17 and draw the latch 15 towards the end wall 7. As soon as the latch moves from beneath the spur 21, the platform will be released and the weight of the animal will swing the platform downwardly. It only takes a very slight pressure upon the trigger plate 19 to move the latch out of supporting engagement with the platform. Therefore, the platform will swing downwardly as soon as the animal places a foot upon the trigger plate and the animal will be dropped into the chamber 1 where it will be confined or drowned without having an opportunity to consume the bait. Since the animal must approach the inner end of the platform in order to step upon the trigger plate and release the platform, it will not be scared away by the platform tilting too soon and since the animal will be entirely within the bait housing when the platform is released it will not be able to spring from the tilting platform and escape. A tongue 27 projects upwardly from the wall of the bait pan adjacent the pivot pin 23 and is bent to extend downwardly, as shown at 28, in overhanging relation to the pivot pin and back upon itself, as shown at 28', to provide a counter-weight. By bending the free end of the tongue towards or away from the pin, the proper balance may be imparted to the trigger plate so that the latch will be permitted to return to a proper position for engaging beneath the spur 21 when the platform returns to its horizontal position after being released. A door 29 is provided for the top of the bait housing and is preferably formed of perforated sheet metal so that an animal may smell the bait placed in the pan below the door and thus be induced into the bait housing. This door is hingedly mounted, as shown at 30, and has its free end portion formed with an upturned lip 31 so that it may be easily grasped and moved to an open or a closed position. A notch 32 is formed in one side of the door near its free end and is intended to receive the shank of a securing pin 33 by means of which the door may be retained in a closed position. It will be obvious that the door must be flexed transversely in order to move it into or out of engagement with the securing pin.

Having thus described the invention, I claim:

1. A trap comprising a confining chamber having an opening in its top, a body resting upon the top of said chamber in enclosing relation to the opening therein and open at its bottom, a platform in said body pivoted intermediate its length and normally remaining in a horizontal position and adapted to swing downwardly through the opening, a bait housing carried by an end portion of said body and disposed in overhanging relation to an end portion of said platform, a latch carried by said body and normally engaging said platform to releasably retain the platform horizontal, a trigger plate pivoted intermediate its length in said housing and extending horizontally therein with its inner end adjacent said platform, a bait pan carried by said trigger plate, an arm of pliable material extending upwardly from said bait pan and bent downwardly in overhanging relation to the pivot mounting for said trigger and constituting a counter-weight, and an operative connection between the latch and trigger.

2. A trap comprising a confining chamber having an opening in its top, a body resting upon said chamber and enclosing said opening and open at its bottom, a platform pivotally mounted in said body and normally horizontal, a resilient latch strip secured to said body and projecting beneath an end of said platform to releasably retain the platform in a horizontal position, a bait housing carried by said body and disposed over the latch supported end portion of said platform, said housing having an inlet in its inner end, a trigger plate pivoted in said housing and extending horizontally therein with its inner end adjacent the last-mentioned end of said platform, and means connecting the trigger plate and latch to move the latch to a releasing position when pressure is applied to the end of the trigger adjacent the platform.

3. A trap comprising a confining chamber having an opening in its top, a body resting upon said chamber and enclosing said opening and open at its bottom, a platform pivotally mounted in said body and normally horizontal, a resilient latch strip secured to said body and projecting beneath an end of said platform to releasably retain the platform in a horizontal position, a bait housing carried by said body and disposed over the latch supported end portion of said platform, said housing having an inlet in its inner end, a trigger plate pivoted in said housing and extending horizontally therein with its inner end adjacent the last-mentioned end of said platform, a tongue depending from the outer end portion of said trigger plate, and a connection between said tongue and latch to move the latch to a releasing position when the inner end of the trigger plate is depressed.

4. A trap comprising a confining chamber having an opening in its top, a body resting upon said chamber and enclosing said opening and open at its bottom, a platform pivotally mounted in said body and normally horizontal, a resilient latch strip secured to said body and projecting beneath an end of said platform to releasably retain the platform in a horizontal position, a bait housing carried by said body and disposed over the latch supported end portion of said platform, said housing having an inlet in its inner end, a trigger plate pivoted in said housing and extending horizontally therein with its inner end adjacent the last-mentioned end of said platform, a tongue depending from the outer end portion of said trigger plate, and a connecting rod connected with said latch and passed through an opening in said tongue and carrying securing nuts engaging the tongue whereby the rod will move the latch to a releasing position when the inner end of the trigger plate is stepped upon and depressed.

5. A trap comprising a confining chamber having an opening in its top, a housing resting upon said chamber and enclosing the opening and open at its bottom, a platform disposed horizontally in said body near its open upper end and pivoted intermediate its length, a bait housing carried by said body and disposed above one end thereof in overhanging relation to one end portion of said platform, a latch strip disposed vertically in said body beneath the inner end of the platform with its lower end secured to an end wall of the body, said strip diverging upwardly from the wall and having its upper end portion bent outwardly over the wall and adapted to normally engage beneath the inner end of the platform to releasably support the platform in a horizontal position, a trigger plate disposed horizontally in said bait housing and pivoted intermediate its length with its inner end overhanging the inner end of said platform, a tongue extending downwardly from the outer end of said trigger, and a link carried by the outwardly bent upper end of said latch strip and connected with said tongue and serving to move the latch out of supporting engagement with said platform when the inner end of the trigger is stepped upon and depressed.

In testimony whereof I affix my signature.

GROVER L. WINGFIELD. [L. S.]